(12) United States Patent
Locatelli et al.

(10) Patent No.: US 11,320,059 B2
(45) Date of Patent: May 3, 2022

(54) CHECK VALVE

(71) Applicant: Varisco S.r.l., Padua (IT)

(72) Inventors: Andrea Locatelli, Creazzo (IT);
Michele Zuliani, Padua (IT);
Alessandro Gamba, Legnaro (IT);
Davide Moressa, Vignonovo (IT);
Giulio Ferrarese, S. Bonifacio (IT);
Semen Kuptcov, Padua (IT); Skasham Dube, Padua (IT)

( * ) Notice: Subject to any disclaimer, the term of this patent is extended or adjusted under 35 U.S.C. 154(b) by 0 days.

(21) Appl. No.: 16/757,417

(22) PCT Filed: Sep. 11, 2019

(86) PCT No.: PCT/IB2019/057638
§ 371 (c)(1),
(2) Date: Apr. 20, 2020

(87) PCT Pub. No.: WO2020/053774
PCT Pub. Date: Mar. 19, 2020

(65) Prior Publication Data
US 2021/0199209 A1    Jul. 1, 2021

(51) Int. Cl.
*F16K 27/02* (2006.01)
*F16K 15/03* (2006.01)

(52) U.S. Cl.
CPC ........ *F16K 27/0227* (2013.01); *F16K 15/031* (2013.01)

(58) Field of Classification Search
CPC ............................ F16K 27/0227; F16K 15/031
See application file for complete search history.

(56) References Cited

U.S. PATENT DOCUMENTS

| 6,050,294 | A | * | 4/2000 | Makowan | ............... | E03B 7/077 |
| | | | | | | 137/527 |
| 6,648,012 | B2 | * | 11/2003 | Linthorst | .............. | F16K 15/026 |
| | | | | | | 137/522 |
| 2002/0104567 | A1 | * | 8/2002 | Matthews | ............. | F16K 15/033 |
| | | | | | | 137/527.2 |
| 2004/0250863 | A1 | * | 12/2004 | Atkeson | ................ | F16K 25/005 |
| | | | | | | 137/855 |
| 2007/0295406 | A1 | | 12/2007 | German | | |

(Continued)

FOREIGN PATENT DOCUMENTS

GB               165486            6/1921

*Primary Examiner* — Kenneth Rinehart
*Assistant Examiner* — Nicole Gardner
(74) *Attorney, Agent, or Firm* — Themis Law; Franco A. Serafini

(57) ABSTRACT

A check valve for a pump delivery port includes a body having inlet and outlet portions joined by a duct and an opening; a curve having an inlet end to be connected to the delivery port and an outlet end to be connected to the body; and a valve member having a disk-shaped locking portion sealingly interacting with an edge of the curve and a locking portion secured in a seat by a lid of the opening. The valve member moves between open and closed positions and has a metal core made while the locking portion is metal-free. The lid cooperates with the locking portion through a protrusion or a cavity and pushes the valve member toward the curve to the closed position and allows the valve member to deflect to the open position under pressure of a working fluid in equilibrium with the weight of the blocking portion.

12 Claims, 3 Drawing Sheets

(56) References Cited

U.S. PATENT DOCUMENTS

| | | |
|---|---|---|
| 2009/0000666 A1* | 1/2009 | Peyton ................... E03B 9/16 |
| | | 137/15.17 |
| 2016/0010756 A1 | 1/2016 | Fallon |
| 2017/0198823 A1 | 7/2017 | Abouelleil |
| 2017/0307092 A1 | 10/2017 | Grompe |
| 2018/0156488 A1* | 6/2018 | Evans ................... F16K 15/03 |
| 2019/0277415 A1* | 9/2019 | Kennedy .............. F16K 15/033 |

* cited by examiner

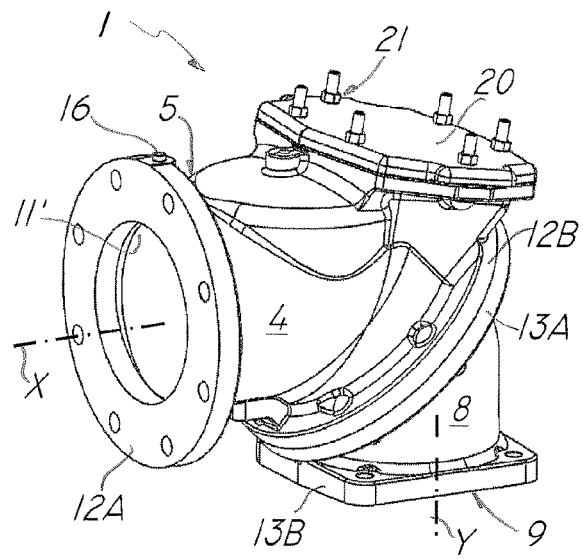
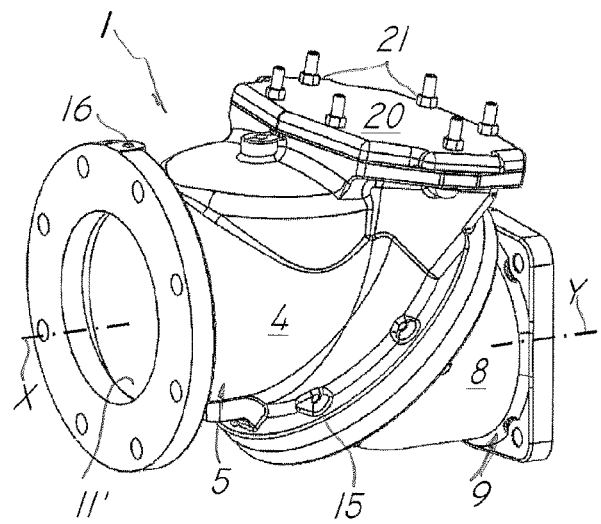
FIG.1
FIG. 2
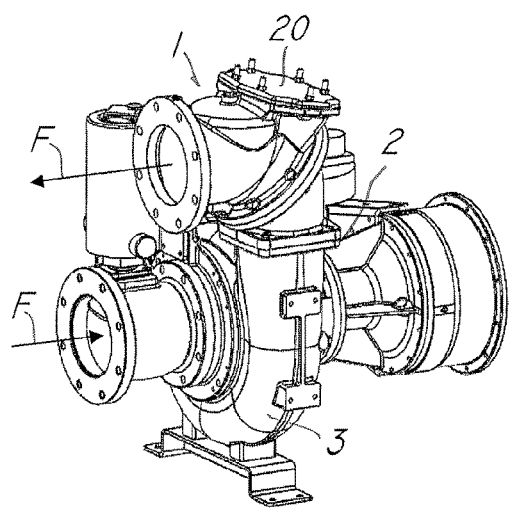
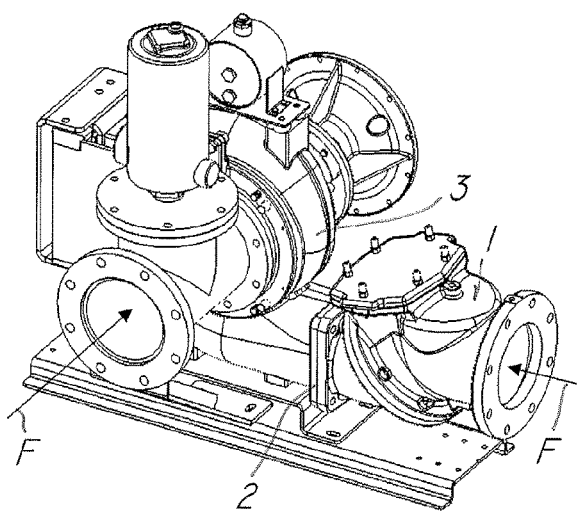
FIG.3
FIG. 4

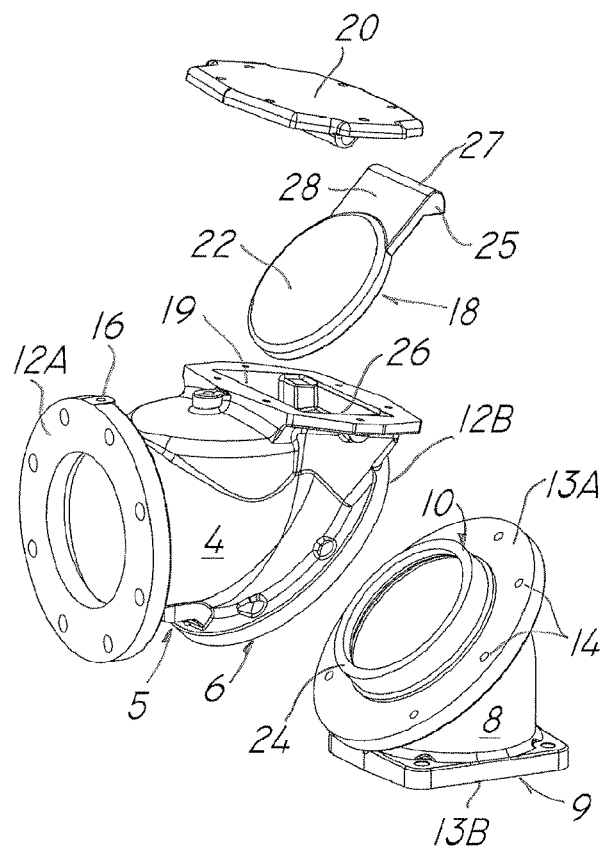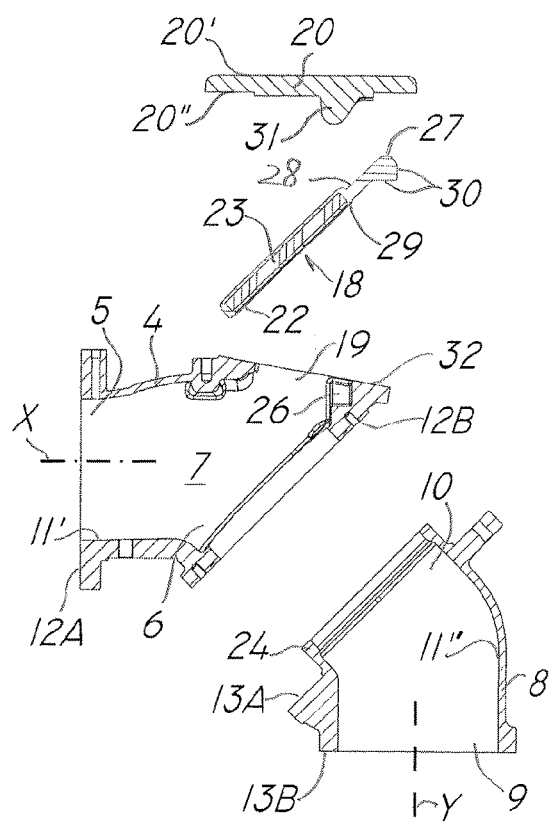
FIG. 5
FIG. 6
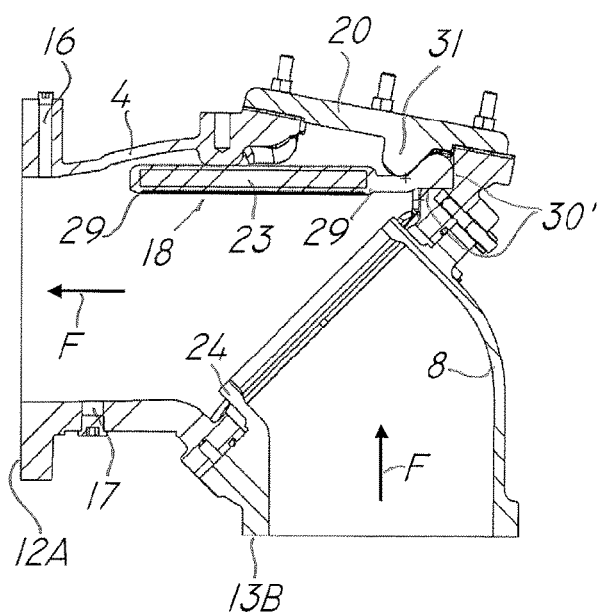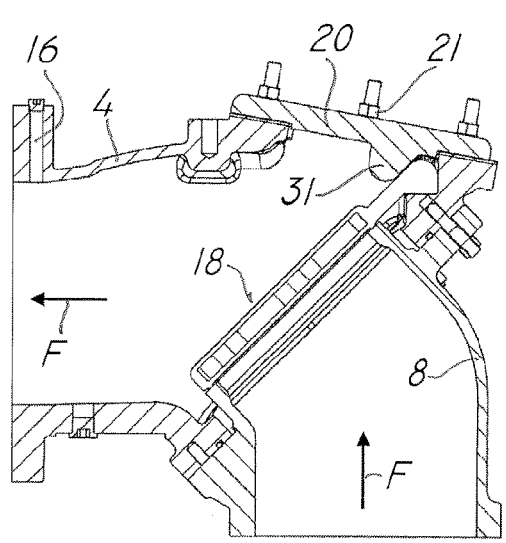
FIG. 7
FIG. 8

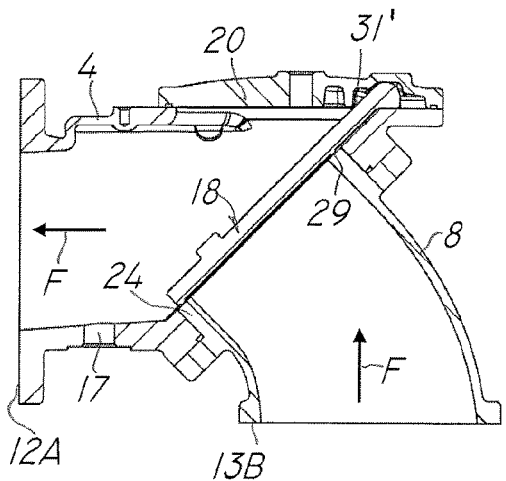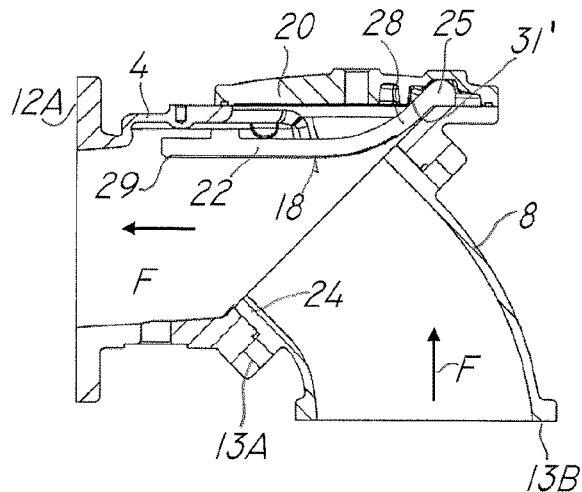
FIG. 9  FIG. 10
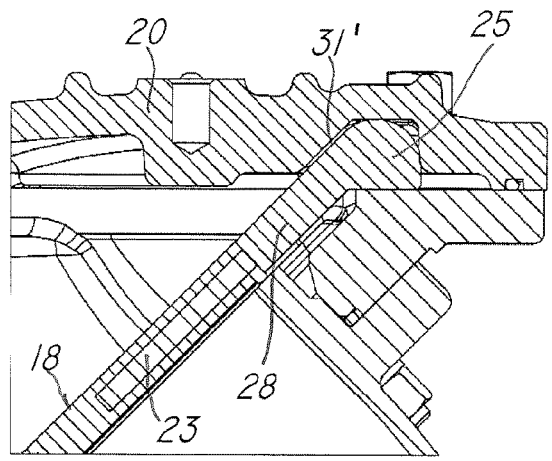
FIG. 11
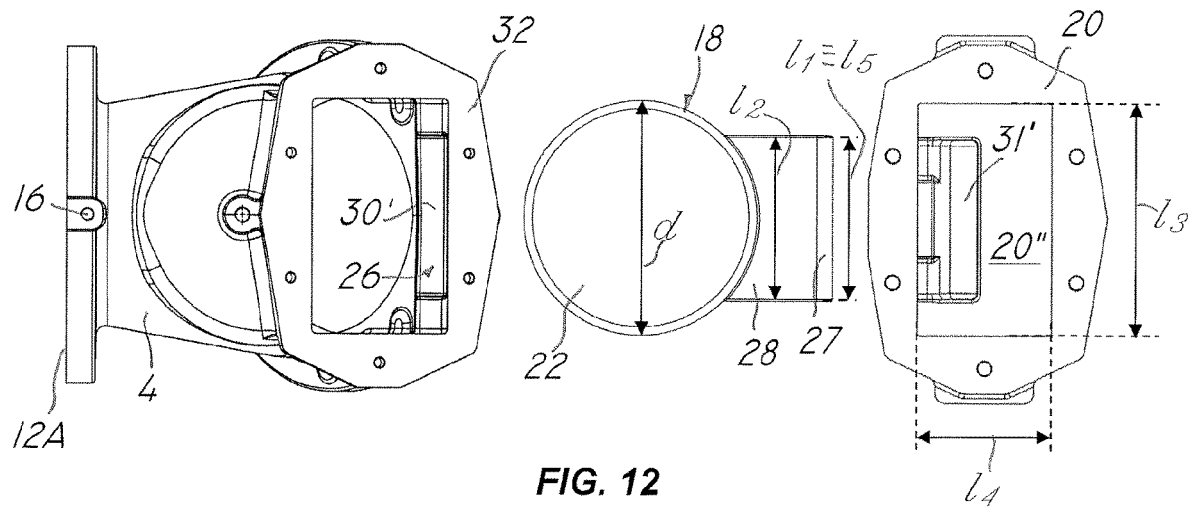
FIG. 12

CHECK VALVE

FIELD OF THE INVENTION

The present invention generally finds application in the field of fluid machines and particularly relates to a check valve for installation on the delivery port of a centrifugal pump.

BACKGROUND ART

Check valves for installation on delivery ports of centrifugal pumps have long been known in the field of fluid machines.

Generally, this type of valve comprises a valve body having an internal path for the fluid delivered by the pump, with an inlet portion and an outlet portion joined together by a guiding duct.

Furthermore, the valve comprises a valve member made of a flexible material and movable between an open position and a position in which the guiding duct is automatically blocked.

In this blocked position the valve member hermetically seals the internal path of the valve body during pump priming and allows the pump system to create the vacuum required to draw the fluid to be pumped.

Check valves are usually applied to centrifugal pumps in pump systems for lifting clear waters or waters filled with suspended solids.

Nevertheless, in order to remove solids from the valve body, the pump system must be stopped and the check valve must be disconnected from the pump system for the valve to be manually accessed via the outlet portion, which increases the cleaning time and downtime.

In an attempt to at least partially obviate this drawback, check valves have been developed with valve bodies that have an inspection opening with a closing lid that can be opened from the outside.

US2017307092 discloses a check valve having a pair of valve bodies which are sealingly coupled by means of respective coupling flanges and having a valve member made of a flexible material.

One of the two valve bodies has an inspection opening with a closing lid that can be opened from the outside for access to the guiding duct without disconnecting the valve from the pump system.

Also, the valve member comprises a locking portion held in a matingly shaped seat formed when coupling the two valve bodies.

A first drawback of this arrangement is that, the inspection opening comprises smaller dimensions than the valve member and an operator must disassemble the valve bodies for replacement of the valve member in case of wear of the latter.

This drawback adds complexity to maintenance and assembly procedures, thereby extending the overall process times.

A further drawback of this arrangement is that the seat is formed on both valve bodies, which considerably extends the overall fabrication time for the check valve.

Another drawback is that the seat has acute angles that would likely wear out the outer surface of the valve member, thereby affecting proper deflection thereof.

Technical Problem

In view of the prior art, the technical problem addressed by the present invention is, in short, to simplify maintenance and replacement of the valve member and increase its durability.

DISCLOSURE OF THE INVENTION

One object of the present invention is to obviate the above drawback, by providing a check valve for installation on the delivery port of a centrifugal pump, that is highly efficient and relatively cost-effective.

A particular object of the present invention is to provide a check valve of the aforementioned type, that affords quick and simple maintenance.

A further object of the present invention is to provide a check valve of the aforementioned type that has a small size.

Another object of the present invention is to provide a check valve of the aforementioned type, that requires no particular operator skills during cleaning.

A further object of the present invention is to provide a check valve of the aforementioned type that affords direct on-site inspection of the interior of the valve body without disassembling the valve from the pump system.

These and other objects, as more clearly explained hereinafter, are fulfilled by a check valve for installation on the delivery port of a centrifugal pump in a pump system as defined in claim 1, which comprises a valve body with a fluid inlet portion and a fluid outlet portion joined together by a guiding duct, a connection curve coupled to the valve body and having a fluid inlet end adapted to be connected to the delivery of the pump and an outlet end adapted to be connected to the valve body and a valve member associated with the valve body and made of flexible material, and adapted to move between an open position and position in which it automatically blocks the guiding duct, wherein the valve body is equipped has an inspection opening with a closing lid that can be opened from the outside.

The valve member comprises a flap disk-shaped blocking portion which is intended to sealingly interact with one edge of the curve that projects into the body and a locking portion held in a matingly shaped seat that is only formed in the body and secured therein by the lid.

According to a peculiar aspect of the invention flap disk-shaped blocking portion comprises a core made of a metal material, the locking portion is free of any metal material and, in addition, the lid is configured to cooperate with the locking portion through a protrusion or a cavity to push the valve member toward the outlet end of the curve to the blocked position and to allow the valve member to deflect toward the interior of the body to the open position under the pressure of the working fluid in equilibrium with the weight of the blocking portion.

The lid has an outer profile with a greater length and a smaller length and the valve member is smaller in size than the greater length of the lid, for said valve member to be entirely pulled out of it. Preferably, said outer profile is substantially polygonal.

This combination of features affords quick and simple maintenance, reduces maintenance time and increases the durability of the valve member.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a method of manufacturing a check valve for installation on the delivery port of a centrifugal pump which is described as a non-limiting example with the help of the annexed drawings, in which:

FIGS. 1 and 2 are perspective views of the check valve of the invention, in first and second operating configurations respectively;

FIGS. 3 and 4 are perspective views of the valve of FIG. 1 and FIG. 2 respectively, installed on the delivery port of a centrifugal pump;

FIG. 5 is an exploded perspective view of the valve of FIG. 1;

FIG. 6 is a broken-away lateral view of the valve of FIG. 5;

FIGS. 7 and 8 are broken-away lateral views of a first embodiment of the valve of FIG. 1 in first and second operating configurations of the valve member respectively;

FIGS. 9 and 10 are broken-away lateral views of a second embodiment of the valve of FIG. 1 in first and second operating configurations of the valve member respectively;

FIG. 11 is an enlarged view of the valve of FIG. 9;

FIG. 12 is an exploded top view showing the valve body, the valve member and the lid of the check valve of the invention.

DETAILED DESCRIPTION OF A PREFERRED EXEMPLARY EMBODIMENT

Particularly referring to the figures, there is shown a check valve, generally designated by numeral 1, which is designed for installation on the delivery port 2 of a centrifugal pump 3 in a pump system.

The centrifugal pump 3 may be designed to be used to lift a fluid F consisting of clear waters or waters filled with suspended solids and the pump system may be installed, for example, in drainage plants for use in building and industrial applications to pump water drawn from the ground.

Thus, the check valve 1 of the invention complies with the standard UNI EN12050-4 concerning wastewater lifting plants for buildings and sites and in particular check valves for fecal-free wastewater and wastewater containing fecal matter.

In a preferred embodiment of the invention, the check valve 1 comprises a valve body 4 with an inlet portion 5 and an outlet portion 6 for the fluid F, which are joined together by a guiding duct 7 that defines a first longitudinal axis X.

As is known per se, the outlet portion 6 may be connected to a delivery duct of the pump system, not shown, for draining the fluid F from the centrifugal pump 3 once it has passed the guiding duct 7.

The check valve 1 further comprises a curved connecting element, hereinafter connection curve 8, having an inlet end 9 for the fluid F adapted to be connected to the delivery of the pump 3, and defining a longitudinal axis Y, and one outlet end 10 adapted to be connected to the valve body 4.

As is known per se, the valve body 4 and the connection curve 8 are adapted to be sealingly coupled together by means of an O-ring, or the like, not shown.

Conveniently, the body 4 and the curve 8 may consist of respective cast iron castings having inner surfaces 11', 11" coated with a layer of epoxy paint to prevent the formation of oxides and ensure proper strength against impacts by any solid materials suspended in the pumped fluid F.

As shown in FIGS. 1 to 4, the inlet portions 5 and outlet portions 6 of the valve body 4 may have respective connecting flanges 12A, 12B having a substantially circular shape.

Furthermore, the connection curve 8 may comprise a connecting flange 13A for connection to the valve body 4, having a substantially circular shape and a connecting flange 13B for connection to the pump 3, having a substantially square shape, to reduce the amount of base material, the time for assembly with the pump 3 and the overall dimensions.

It shall be noted that, due to the circular shape of the connecting flanges 12B, 13A between the valve body 4 and the curve 8 and the particular shape of the curve 8, the overall dimensions of the valve 1 may be much smaller as compared with those obtained with a prior art valve having substantially elliptical flanges and with a longitudinal valve body intended to be coupled with a valve body of the same type.

The outlet portion 6 of the valve body 4 and the outlet end 10 of the curve 8 are designed to be coupled together by the respective substantially circular connecting flanges 12B, 13A which comprise a plurality of threaded holes 14.

This feature allows the body 4 and the curve 8 to be coupled between a first elbow configuration in which the inlet end 9 of the curve 8 is perpendicular to the outlet portion 6 of the body 4, as shown in FIG. 1, and an aligned configuration in which the inlet end 9 of the curve 8 is substantially coaxial with the outlet portion 6 of the body 4, as shown in FIG. 2.

In other words, in the first configuration, the first longitudinal axis X is orthogonal to the second longitudinal axis Y, and in the second configuration the first longitudinal axis X is substantially parallel to the second longitudinal axis Y.

With this adjustment feature, the check valve 1 can be adapted to a centrifugal pump 3 whose volute has an upward delivery, as shown in FIG. 3 or is rotated 90° with the delivery downwards, as shown in FIG. 4.

In addition, it may be noted that the coupling holes 14 in the circular flanges 12B, 13A allow an operator to possibly install valve 1 at angles other than those described above according to the characteristics of the pump system in which the system is located.

In the valve 1 as shown in the figures, the circular flange 12B of the inlet portion 5 of the valve body 4 has eight equally spaced blind threaded holes 14, arranged along the perimeter of a circumference and receiving the studs 15 for connection of the curve 8.

Furthermore, the circular flange 13A of the outlet end 10 of the curve 8 has seven threaded holes 14 arranged on eight positions.

With this configuration the curve 8 may have a very compact size and an operator is not required to insert a nut in the eighth position, which provides time savings.

Conveniently, the outlet portion 6 of the valve body 4 may comprise a coupling 16 for installation of a pressure gage to measure the pressure of the fluid F when the pump system is running and a drain hole 17 for the pumped fluid F stagnating in the valve body 4 to be drained off when the system is turned off.

The check valve 1 also comprises a valve member 18 associated with the valve body 4, and the latter has an inspection opening 19 with a closing lid 20 that can be opened from the outside.

The lid 20 is attached to the body 4 by screw means 21 that can be accessed from the outside and the seal may be ensured by a flat rubber gasket, not shown.

As best shown in FIGS. 7 to 10, the valve member 18 is made of a flexible material and is movable between an open position and a position in which the guiding duct 7 is automatically blocked.

The valve member 18 comprises a flap disk-shaped blocking portion 22 which is intended to sealingly interact with one edge 24 of the curve 8 that projects into the body 4 and a locking portion 25.

The locking portion 25 is held in a matingly-shaped seat 26 that is only formed in the valve body 4 and is secured therein by the lid 20 for imparting local flexibility to the valve member 18.

In a peculiar aspect of the invention, the flap disk-shaped blocking portion 22 has a core 23 made of a metal material and the locking portion 25 is free of any metal material.

In particular, the metal core 23 may be uniformly distributed in the blocking portion 22 and also have a disk shape. Alternatively, the metal core 23 may be composed of a plurality of metal elements adapted to stiffen the disk-shaped portion 22.

Advantageously, the lid 20 is configured to cooperate with the valve member 18 to push it toward the outlet end 10 of the curve 8 to the blocked position and to allow the valve member 18 to deflect toward the interior of the valve body 4 to the open position under the pressure of the working fluid F in equilibrium with the weight of the blocking portion 22.

The locking portion 25 comprises a fitting end 27 appropriately shaped to fit into the seat 26 and is connected to the blocking portion 22 by a substantially plate-like connecting portion 28, as shown in FIGS. 6 to 8.

Furthermore, the disk-shaped blocking portion 22 has a predetermined diameter d and the fitting end 27, as well as the plate-like connecting portion 28 comprise a width $l_1$, $l_2$ that is smaller than the predetermined diameter d.

In the valve member 18 of the figures, the width $l_1$ of the fitting end 27 coincides with the width $l_2$ of the plate-like portion 28.

Nevertheless, the plate-like portion 28 may have a greater width $l_2$ greater than the width $l_1$ of the fitting end 27 as long as it is smaller than the value of the diameter d of the disk-shaped blocking portion 22.

As best shown in FIGS. 7 and 8, the projecting edge 24 of the curve 8 has a substantially annular shape and may be advantageously obtained by machining.

In particular, the blocking portion 22 of the valve member 18 may have an annular protrusion 29 which is adapted to cooperate with the projecting edge 24 to improve the sealing effect of the valve member 18 to the blocked position.

Preferably, the fitting end 27 of the valve member 18 may comprise a bulge with a curved outer profile that faces the lid 20 and is delimited by a pair of orthogonal flat surfaces 30 that face the valve body 4.

Conveniently, the seat 26 formed in the valve body 4 has a mating shape defined by a pair of substantially orthogonal flat surfaces 30', as shown in FIGS. 7 to 11.

In particular, a small clearance may be provided between the seat 26 of the valve body 4 and the fitting end 27 of the valve element 18 to allow the latter to adapt and entirely adhere to the projecting edge 24 of the curve 8 under its own weight. For this purpose, the metal core 23 of the blocking portion 22 may be suitably sized to assist adhesion.

According to an additional particular aspect of the invention, the lid 20 may have an outer profile with a greater length $l_3$ and a smaller length $l_4$, to reduce the longitudinal dimensions of the curve 8 and the valve body 4. Preferably, said outer profile is substantially polygonal.

Therefore, the diameter d of the blocking portion 22 may be slightly smaller than the greater length $l_3$ of the lid 20 for the valve member 18 to entirely pulled out of it as shown in FIG. 11, without disassembling the valve 1 from the pump system.

The lid 20 may have a substantially flat outwardly-facing first surface 20' which is adapted to receive the screw means 21 and a conveniently shaped second surface 20" that faces the guiding duct 7.

According to a further peculiar aspect of the invention, the lid 20 is configured to cooperate with the locking portion 25 through the protrusion 31 or a cavity 31' to push the valve member 18 toward the outlet end 10, as clearly shown in FIGS. 7 to 11.

In particular, the lid 20 is configured to cooperate with the specially fitting end 27 of the locking portion 25 through a protrusion 31 or a cavity 31' formed on the second surface 20", at the greater length $l_3$ of the lid 20, so that it will act as a flex zone between the open position and the blocked position.

Conveniently, the protrusion 31, or the cavity 31', may have a width $l_3$ substantially equal to the width $l_1$ of the specially fitting end 27.

In a first embodiment as shown in FIGS. 5 to 8, the lid 20 has a protrusion 31 whose cross section is similar to that of the specially fitting end 27 of the valve member 18, and comprises a curved profile whose concavity faces the valve member 18 and partially contacts the specially fitting end 27.

In a second embodiment as shown in FIGS. 9 and 10, the lid 20 may comprise a cavity 31' whose cross-sectional shape mates that of the specially fitting end 27 of the valve member 18, and comprises a curved profile whose convexity is adapted to receive the valve member 18 and entirely contacts the specially fitting end 27.

Conveniently, during fabrication of the valve 1, the relative positions of the valve body 4 and the lid 20 may be defined by the machining operations carried out on the pair of flat surfaces 30' of the seat 26, which may be used as reference planes in the formation of the support surface 32 for the lid 20 on the valve body 4.

By this arrangement, both the position of the protrusion 31 or the cavity 31', relative to the valve member 18 and the corresponding flex point may be defined.

Preferably, the disk-shaped blocking portion 22 of the valve member 18 may be made of rubber to impart good abrasion resistance and may comprise a double folded internal fabric lining to prevent natural elongation of the valve member 18 under its own weight.

The material of the disk-shaped blocking portion 22, may be nitrile butadiene rubber (NBR), VITON rubber or the like.

The operation of the check valve 1 installed on the delivery port 2 of a centrifugal pump 3 will be now described by way of example, with reference to FIGS. 3 and 4.

In operation, while the pump 3 is being primed, the valve member 18 sealingly rests on the projecting edge 24 of the curve 8, thereby preventing the passage of air from the delivery port 2 toward the interior of the volute of the pump 3 and ensuring the creation of the vacuum required to suck in the fluid F from the suction duct.

Once priming is completed, the fluid F flows through the centrifugal pump 3 and pushes against the valve member 18 which moves from the blocked position to the open position thereby allowing the fluid F to flow into the guiding duct 7 of the valve body 4.

As discussed above and as shown in the figures, the deflection of the valve member 18 occurs at the plate-like connecting portion 28 through the protrusion 31, or the cavity 31', in the lid 20.

Finally, when the centrifugal pump 3 is stopped, the valve member 18 moves back to the blocked position, thereby preventing any backflow of the fluid F from the high-pressure zone, downstream from the pump 3, to the low-pressure zone, upstream from the pump 3, and avoiding water hammers on the impeller.

Maintenance or cleaning of the check valve 1 of the present invention will simply require the lid to be opened and the valve member 18 to be pulled out.

It will be appreciated from the foregoing that the check valve fulfills the intended objects and particularly affords quick and simple maintenance, with reduced maintenance times and increased durability of the valve member.

The check valve of the invention is susceptible of a number of changes and variants, within the inventive concept as disclosed in the appended claims.

While the check valve has been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in fluid machine manufacturing plants.

The invention claimed is:

1. A check valve (1) for installation on a delivery port (2) of a centrifugal pump (3) in a pump system, said check valve (1) comprising:
   a valve body (4) with an inlet portion (5) and an outlet portion (6) for a fluid (F), the inlet portion (5) and the outlet portion (6) being joined together by a guiding duct (7);
   a connection curve (8) coupled to said valve body (4) and having an inlet end (9) for the fluid (F), adapted to be connected to the delivery port (2) of the pump (3), and an outlet end (10) adapted to be connected to said valve body (4); and
   a valve member (18) associated with said valve body (4), said valve member (18) being made of a flexible material and being movable between an open position and a blocked position in which said guiding duct (7) is automatically blocked;
   wherein said valve body (4) has an inspection opening (19) with a closing lid (20) configured to be opened from outside;
   wherein said valve member (18) comprises a flap- and disk-shaped blocking portion (22) which is intended to sealingly interact with a projecting edge (24) of said connection curve (8) that projects into said valve body (4), and a locking portion (25) held in a matingly shaped seat (26), which is only formed in said valve body (4), and secured therein by said closing lid (20);
   wherein said flap- and disk-shaped blocking portion (22) comprises a core (23) made of a metal material and said locking portion (25) is free of any metal material, said closing lid (20) being configured to cooperate with said locking portion (25) via a protrusion or a cavity (31) to push said valve member (18) toward the outlet end (10) of said connection curve (8) in said blocked position and to allow said valve member (18) to deflect toward an interior of said valve body (4) to said open position under pressure of the fluid (F) in equilibrium with a weight of said blocking portion (22),
   wherein said locking portion (25) comprises a fitting end (27) shaped to fit into said seat (26) and connected to said blocking portion (22) with a substantially plate-shaped connecting portion (28), said connecting portion (28) acting as a flex zone for the valve member (18) between the open position and the blocked position with said protrusion or cavity (31),
   wherein said disk-shaped blocking portion (22) has a predetermined diameter (d), said fitting end (27) and said plate-shaped connecting portion (28) having widths ($l_1, l_2$) that are smaller than said predetermined diameter (d), and
   wherein said closing lid (20) has an outer profile with a greater length ($l_3$) and a smaller length ($l_4$), said predetermined diameter (d) being smaller than said greater length ($l_3$) for said valve member (18) to be entirely pulled out of said closing lid.

2. The check valve as claimed in claim 1, wherein said closing lid (20) has a substantially first flat surface (20') that faces the outside and a shaped second surface (20") that faces said guiding duct (7), said closing lid (20) being configured to cooperate with said shaped end (27) of said locking portion (25) by said protrusion or said cavity (31) formed on said shaped second surface (20"), at the greater length ($l_3$) of said closing lid (20).

3. The check valve as claimed in claim 1, wherein said protrusion or said cavity (31) has a width (l5) that is substantially equal to a width ($l_1$) of said fitting end (27).

4. The check valve as claimed in claim 1, wherein said projecting edge (24) of said curve (8) has a substantially annular shape and is obtained by machining, said blocking portion (22) of said valve member (18) having an annular protrusion (29) adapted to cooperate with said projecting edge (24) to improve a sealing effect of said valve member (18) in said blocked position.

5. The check valve as claimed in claim 1, wherein said shaped end (27) comprises a bulge with a curved outer profile delimited by a pair of substantially orthogonal flat surfaces (30).

6. The check valve as claimed in claim 1, wherein said closing lid (20) is attached to said body (4) by one or more screws (21) that can be accessed from the outside.

7. The check valve as claimed in claim 1, wherein said blocking portion (22) is made of rubber with a double folded internal fabric lining to prevent an elongation of said valve member (18) under its own weight.

8. The check valve as claimed in claim 1, wherein said inlet portion (5) and said outlet portion (6) of said valve body (4) have respective connecting flanges (12A, 12B, 13A) having a substantially circular shape.

9. The check valve as claimed in claim 1, wherein said connection curve (8) has a first connecting flange (13A) for connection to said valve body (4), having a substantially circular shape, and a second connecting flange (13B) for connection to said pump (3), said second connection flange having a substantially square shape, to reduce an amount of base material.

10. The check valve as claimed in claim 1, wherein said inlet portion (5) of said valve body (4) and said outlet end (10) of said connection curve (8) are designed to be coupled together between a first elbow configuration, in which the inlet end (9) of said connection curve (8) is perpendicular to the outlet portion (6) of said valve body (4), and an aligned configuration, in which the inlet end (9) of said connection curve (8) is substantially coaxial with the outlet portion (6) of said body (4).

11. The check valve as claimed in claim 1, wherein said valve body (4) and said connection curve 8 are cast iron castings having inner surfaces (11', 11") coated with a layer of epoxy paint to prevent formation of oxides and ensure proper strength against impacts by solid materials suspended in the pumped fluid (F).

12. The check valve as claimed in claim 1, wherein said outlet portion (6) comprises a coupling (16) for installation of a pressure gage and a drain hole (17) for the pumped fluid (F) stagnating in the valve body (4) to be drained off.

* * * * *